Feb. 16, 1965  R. W. DOWLING ETAL  3,170,024
BINOCULAR TELESCOPE WITH SLIDING LENS
CASINGS AND CENTRAL FOCUSING MEANS
Filed Dec. 30, 1958  4 Sheets-Sheet 1

*INVENTORS*
ROBERT W. DOWLING
LORENZO Del RICCIO

BY
ATTORNEYS

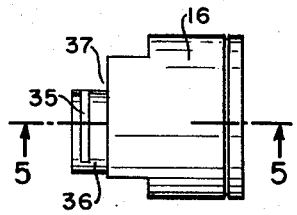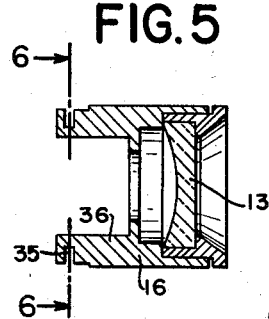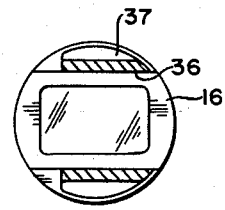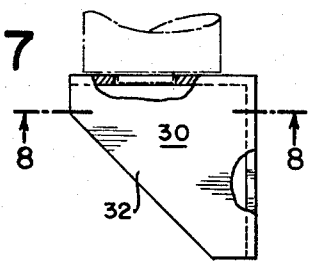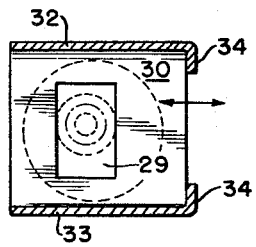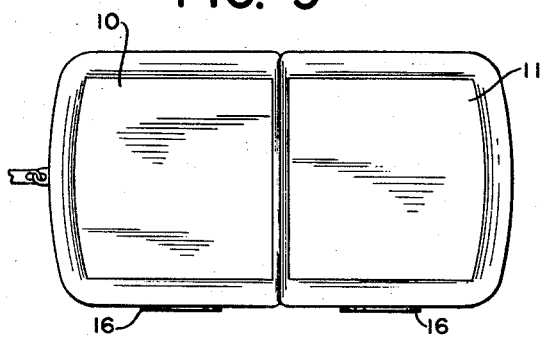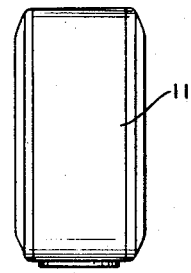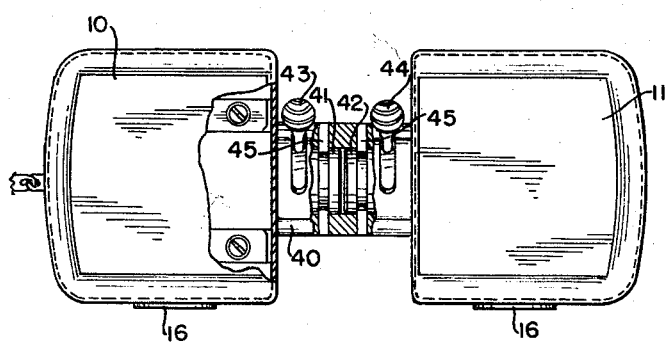

Feb. 16, 1965

R. W. DOWLING ETAL 3,170,024

BINOCULAR TELESCOPE WITH SLIDING LENS
CASINGS AND CENTRAL FOCUSING MEANS

Filed Dec. 30, 1958

INVENTORS
ROBERT W. DOWLING
LORENZO Del RICCIO

BY

ATTORNEYS

*INVENTOR.*
ROBERT W. DOWLING
LORENZO Del RICCIO 3,170,024
BINOCULAR TELESCOPE WITH SLIDING LENS
CASINGS AND CENTRAL FOCUSING MEANS
Robert Whittle Dowling, New York, N.Y., and Lorenzo
Del Riccio, Bel Air, Los Angeles, Calif., assignors to
D & D Company, Inc., New York, N.Y., a corporation
of Delaware
Filed Dec. 30, 1958, Ser. No. 783,977
Claims priority, application Germany, Jan. 7, 1958,
H 32,061
2 Claims. (Cl. 88—34)

This invention relates to a quality binocular telescope which may be instantly collapsed to a compact, generally rectangular, smooth, relatively thin, box-like configuration and in which form it may be readily inserted in, or removed from, pocket or purse.

Binocular telescopes of both the "opera glass" and "field glass" types, have been proposed or made wherein the lens mounts, supports and enclosures may be compacted or collapsed as by telescoping, folding, and hinging, but such compacting as heretofore attained or proposed has been at the expense either of instrument quality and optical performance, or it has proved insufficient to provide a form or contour which permits ready insertion and easy removal from pocket or purse. Furthermore, the lack of smooth and regular external surfaces on many of the prior binoculars when compacted, necessitated the use of a separate case or sheath for carrying the binocular in pocket or purse. Thus, the sacrifice made to attain compactibility at the expense of instrument quality and optical performance was for relative naught.

It is the principal object of the present invention to provide a binocular construction which overcomes the disadvantages of such prior effects in that it at once achieves an unusual degree of compactness with smooth, continuous and regular external contours, yielding excellent optical performance when extended in use. To these ends two similar, preferably rectangular, box-like casings are employed, each containing an eyepiece lens and an associated objective lens in telescope optical combination, each casing, or at least one thereof, being slidably arranged on a common central support for mutual displacement transverse the optical axes of the two telescope combinations. Thus, when the casings are mutually displaced and outwardly extended on the central support, they may be suitably positioned to accommodate the interpupillary distance of the viewer's eyes. When the two casings are moved to mutually contiguous positions they then completely enclose the said central support and the binocular becomes compacted to a substantially continuous, smooth, generally rectangular, relatively thin box-like configuration in which it may be readily inserted and carried in pocket or purse.

Further, in accordance with one embodiment of the present invention, the lens system of each telescope of the binocular includes an objective (positive) lens of generally rectangular form providing a rectangular field stop and entrance window, and a circular eyepiece (negative) lens or ocular, in Galilean telescope optical combination. With such a system, the eye is the aperture stop, and the entrance window, that limits the angle at which principal rays can arrive, is the objective. Although the extent of field of view is limited in the vertical direction by the lesser dimension of the rectangular objectives, it does not impair the viewing of action taking place on a theatre stage nor that of sporting events since the area which would be covered by a full circle opening of a circular objective would include in its angle of view unnecessary top and bottom portions of such fields. Moreover, stage action and the action at sporting events both take place within an area generally rectangular in form. The adoption by the motion picture industry of a rectangular screen enlarged in its horizontal dimension illustrates by analogy what is accomplished with the optical design of the rectangular objective-circular ocular combination of the present invention. The binocular of the present invention in use, for example, at the theatre, or at the race track, creates an interesting and attractive field of view for the observer.

Another feature of the invention resides in the increase in the field of view attained by reason of the lens design with the generally rectangular field stop. In a Galilean telescope having a circular objective and a circular ocular, the field of view decreases as the magnification increases, and the field of view is directly dependent on the aperture ratio of the objective—the quotient of its aperture and its focal length. If an attempt is made to increase the field of view by increasing the aperture ratio, it becomes difficult to correct the system for color, distortion and astigmatism. But with a three-element, generally rectangular objective, in accordance with the present invention, the problem becomes less difficult. Not only are the said corrections more easily achieved, but it becomes possible to provide a larger aperture ratio and thus cover a wider field of view of generally rectangular form.

According to the invention, the rectangular objectives are formed by symmetrically cutting and removing top and bottom portions from original circular objectives so that the lesser (width) dimension of the rectangle is substantially that of the thickness of the casings. Since the greater (longitudinal) dimension of the rectangular objective is not critical in relation to interocular distance, unprecedently compact construction of the box-like casings becomes possible without apparent reduction of field of view. The top and bottom of the view field is generally less important to a spectator-viewer so that the field of vision with the improved binocular, for example, of a stage scene or a sporting event is not perceptively diminished.

The box-like casings, with plane bounding surfaces finished in any manner, for example, with applied thin leather covering, enamel, nickel plating, chrome or anodizing, may be safely placed in the pocket or handbag without a case or sheath.

Further, in accordance with the invention, the common central support for the box-like casings consists of two U-shaped guide portions rigidly joined by a central section. The U-shaped portions are slidably arranged in the box-like casings with the U-shape providing an open line of sight through each casing. Thus, the casings may be mutually displaced by sliding on the U-members to extended positions or the casings may be brought to mutually contiguous positions.

In one embodiment of the invention a small diameter shaft or pin is arranged within the central section connecting and supporting the U-shaped members. The shaft may be turned about its axis clockwise or counterclockwise by means of a lever affixed to the shaft and emerging through a curved slot in the central section. At the ends of the shaft, eccentrically attached forks or connectors are provided whose prongs enter guide slots in the eyepiece mounts, and slidably embrace them. Thus, the eyepieces can be jointly thrust back and forth along the optical axes thereof to adjust for correct focus. By splitting the shaft into two independent parts, each turned by its own lever emerging through slits in the central section, the two eyepieces may be rendered independently adjustable to proper focus.

In another embodiment of the invention, the eyepieces are adjusted for focus by means of a thumb wheel or nut, which actuates a yoke housed within the central section of the assembly. The yoke slidably embraces the eyepieces, accommodating interpupillary adjustment, but is interlocked with the eyepieces for movement in the direction of the optical axis.

For a better understanding of the invention, reference should be made to the following detailed description and to the accompanying drawing, in which:

FIG. 4 is a plan view of an eyepiece mount incorporated in the binocular of FIG. 1;

FIG. 5 is a cross-sectional view taken on line 5—5 of FIG. 4;

FIG. 6 is a cross-sectional view taken on line 6—6 of FIG. 5;

FIG. 7 is a plan view, partly in section, of a fork-like connector member for adjusting the eyepiece mount;

FIG. 8 is a cross-sectional view taken on line 8—8 of FIG. 7;

FIGS. 9 and 10 are plan and elevational views, respectively, of the binocular of FIG. 1, with the casing parts in closed positions;

FIG. 11 is a plan view, partly in section, of one modified form of the binocular of FIG. 1, providing for independent focus of the optical assemblies;

Figure 12:
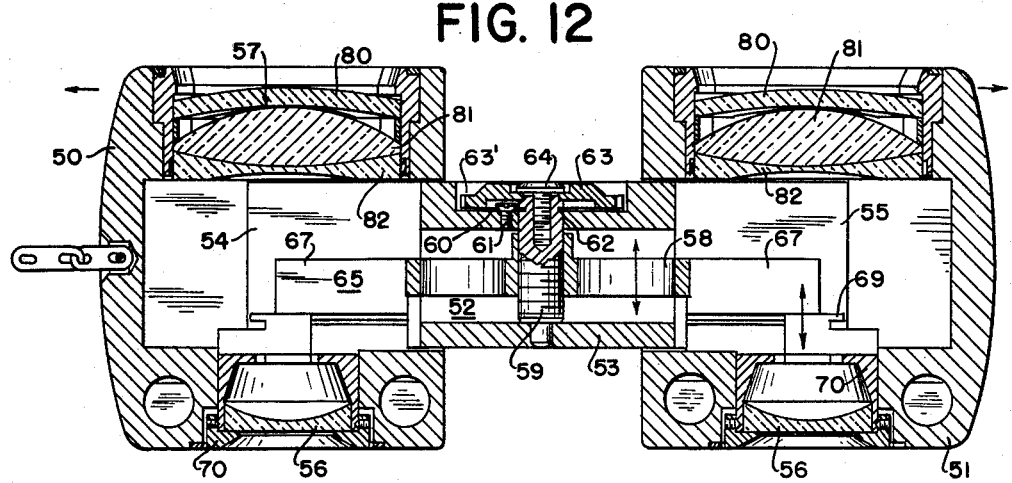
FIG. 12 is a longitudinal sectional view of a modified form of the new binocular, with the casing parts in separated or open positions.
Figure 15:
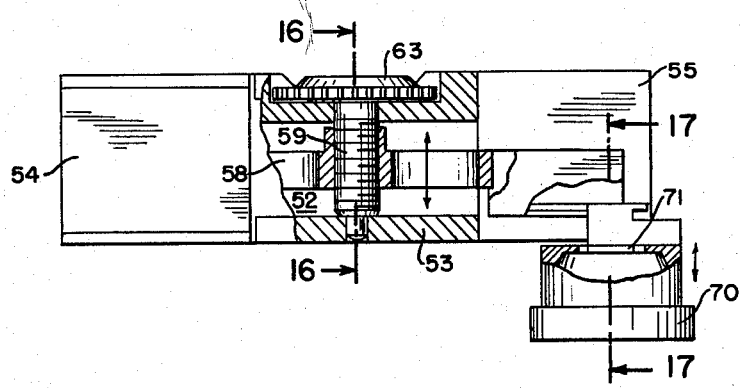
FIG. 15 is a plan view, partly in section, of the eyepiece adjusting mechanism of the binocular of FIG. 12.
Figure 16:
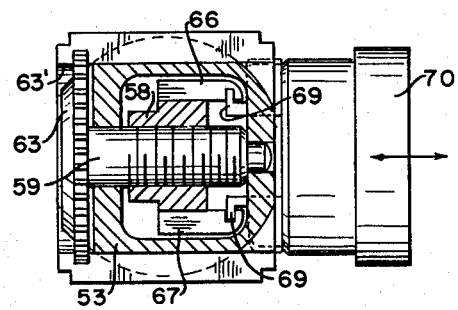
Figure 17:
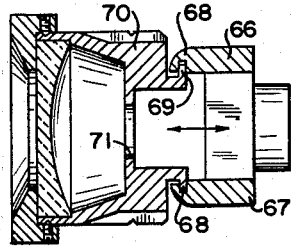
Figure 18:
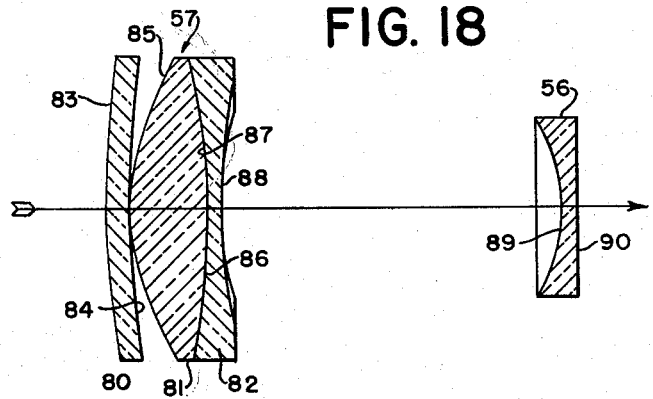
Figure 19:
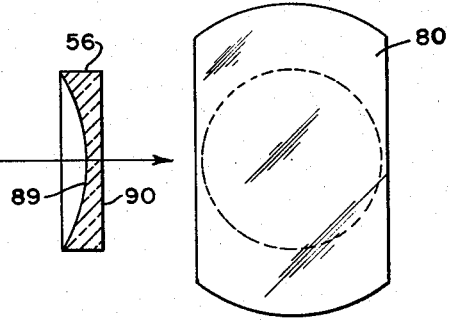

FIGS. 16 and 17 are enlarged, cross-sectional views taken on lines 16—16 and 17—17, respectively, of FIG. 15;

FIG. 18 is a schematic representation of an improved optical system incorporated in the binocular of FIG. 12; and FIG. 19 is a view of the front or objective end of the optical system of FIG. 18.

Referring now to the drawing, and initially to FIGS. 1–10 thereof, the binocular of the invention comprises a pair of box-like casings 10, 11, each housing an optical system, including an objective combination 12 and an eyepiece 13. The eyepiece 13 is a concave or negative lens, so that the optical system or combination of each casing is arrayed in Galilean telescope optical combination.

Figure 14:
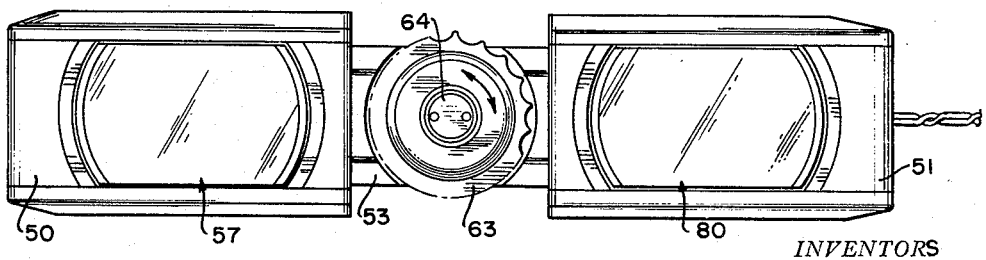
FIG. 14 is an elevational view of the binocular of FIG. 12, with the casing parts in open positions.

The principal casing parts 10, 11 are generally U-shaped in plan, with the open sides facing each other, and the height or thickness of the casings is substantially less than its width measured transverse the optical axis. The forward sections of the casings are recessed to receive objective mounts 14, and these mounts, as well as the objective combinations carried thereby, are of generally rectangular outline, being of small height in relation to width, substantially as shown in FIG. 14.

A bore 15 is provided in the back wall of each casing to receive an eyepiece mount 16 carrying a lens 13. The eyepiece mounts, which may be generally cylindrical in outline, are slidable in the bores 15 for movement along the optical axes, toward and away from the objectives 12, whereby focusing is effected.

In accordance with the invention, the U-shaped casings 10, 11 are arranged slidably to receive a unitary support 17, comprising a central section 18 and end parts 19, 20. Advantageously, the central section 18 may be in the form of a hollow tube or sleeve, while the end sections 19, 20 are rectangular in plan and U-shaped in elevation, forming upper and lower arms 19a, 19b and 20a, 20b. The end sections 19, 20 are of such width (measured parallel to the optical axis) as to fit closely between the legs of the U-shaped casings.

Figure 3:
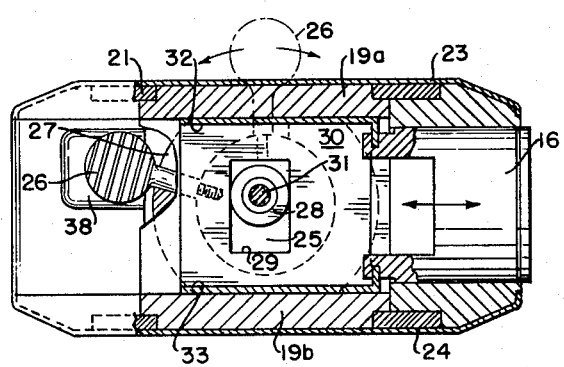
FIG. 3 is a sectional view taken generally along line 3—3 of FIG. 1.

As shown in FIG. 3, the height of the U-shaped end sections 19, 20 is substantially equal to that of the casings, and complementary recesses are provided along the edges of the arms 19a–20b and in the casings for the reception of guide rails 21. The rails 21 are secured to the casings, as by screws 22, and serve to guide the casings 10, 11 accurately in sliding movement in the direction of the axis of the support.

Figure 1:
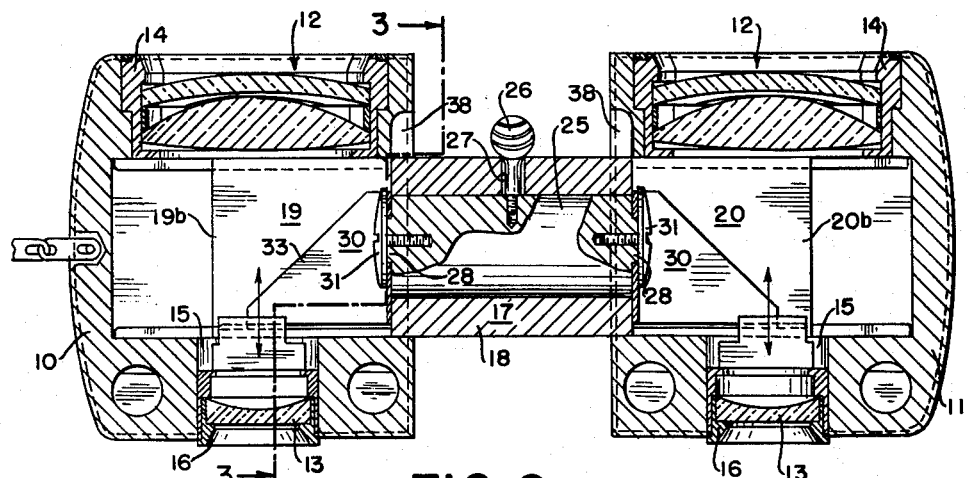
FIG. 1 is a longitudinal, cross-sectional view of a binocular constructed in accordance with the invention, with displaceable casings in separated or open positions.
Figure 2:
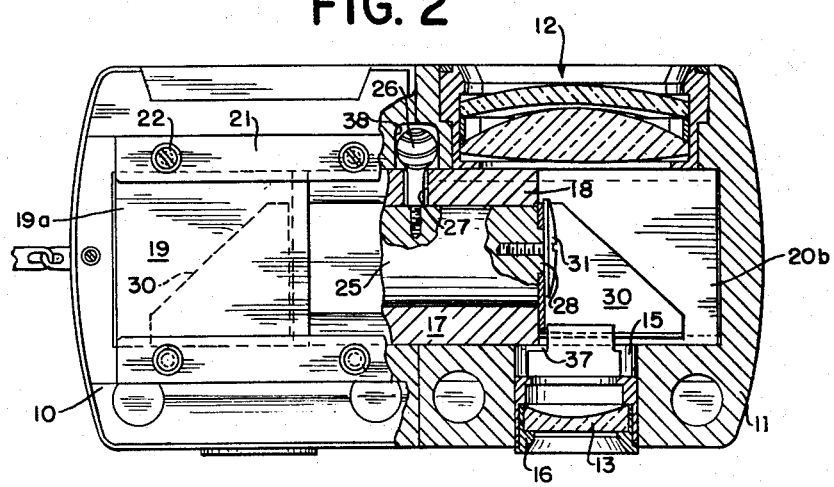
FIG. 2 is a view, partly in section, of the binocular of FIG. 1, with the casings in juxtaposed or closed positions.

As is apparent in FIGS. 2 and 9, the relative proportions of the support 17 and casings 10, 11 are such that the recesses formed by the casings can receive the support in its entirety, permitting the casings to be pushed together to a fully closed position. Separation of the casings is advantageously limited by providing suitable abutments or stops (not specifically illustrated) at the insides of the casings, to engage the base ends of the arms 19a–20b. In this respect, where the central section 18 of the support is of cylindrical form, as illustrated, natural shoulders are formed at the areas of transition between the central and end sections, and these shoulders are engaged by the casing abutment means when the casings 10, 11 are moved to fully separated positions, as shown in FIG. 1.

In the illustrated form of the invention the casings 10, 11 are closed off by cover plates 23, 24 so that, in the complete assembly, the casings are box-like and totally enclosed except for openings to receive the objective and eyepiece mounts and to receive the unitary support 17. The described physical arrangement, made possible by the invention, is highly advantageous in that the closed binocular assembly, illustrated in FIG. 9, is extremely compact and has even, generally rectangular outlines, so that it may be carried in the pocket or purse, for example, without a case, or may be stored in a small space.

One of the advantageous features of the invention resides in the improved arrangement for focusing the optical systems of the binocular assembly. To this end, the binocular of FIGS. 1–10 incorporates, within the unitary center support 17, a shaft 25, journalled by the support, which is manually rotatable through a limited arc by means of a lever 26 projecting through a circumferential slot 27 in the support member. At the ends of the shaft 25, which lie exposed between the spaced arms of the end sections 19, 20, are eccentric bosses 28. These bosses extend through openings 29 in forked connectors 30, illustrated in detail in FIGS. 7 and 8. The connectors are engaged with the shaft 25 by headed screws 31, which permit rotation of the shaft relative to the connectors. As shown best in FIGS. 3 and 8, the connector openings 29 are elongated in the vertical direction, but have a width substantially equal to the diameter of the eccentric bosses 28. Accordingly, when the shaft 25 is rotated within the support 17, the connectors are caused by the eccentric bosses to move toward or away from the objective lenses 12.

In the illustrated form of the invention, the connectors 30, which may be metal stampings, are provided with upper and lower surface portions 32, 33 dimensioned to be received closely between the arms 19a, 19b and 20a, 20b of the support end sections. The connectors, which are substantially smaller in plan dimensions than the arms, are thus guided by the arms for horizontal movement parallel to the optical axes.

At the back edges of the connectors 30 there are provided inturned flanges 34, which extend at right angles to the optical axes and are received in grooves 35 provided in extensions 36 formed on the eyepiece mounts 16. The mounts 16, shown best in FIGS. 4–6, are so formed that the extensions are spaced apart, outside the field of sight through the lenses 13, and the extensions may be asymmetrically disposed to provide a clearance 37 for accommodating closing movement of the casings over the support 17. The grooves 35 and flanges 34 provide for relative movement of the casings 10, 11 with respect to the support 17, while maintaining interlocking engagement between the connectors 30 and eyepiece mounts 16. Accordingly, regardless of the separation of the casings 10, 11, focusing of the optical systems may be effected by manipulation of the lever 26, it being presupposed that the casing separation is sufficient to render the lever accessible. When the casings are fully closed, as shown in FIG. 2, the lever 27 is received in complementary recesses 38 and is thereby fully concealed and protected.

Another important structural feature of the new binocular resides in the use of box-like casings, housing optical systems, which completely envelop a unitary central support and are guided thereby for opening and closing movement and for interpupillary adjustment. In this respect, it is to be observed that the end sections of the support traverse the optical axes but are of U-shape configuration to lie above and below the field of sight. The arrangement provides for a highly compact and rugged binocular assembly, which may incorporate precision optical and mechanical characteristics.

In some instances it may be desirable or expedient to provide for the individual focus or interocular adjustment of the separate optical systems. In such cases, the modified form of the invention, illustrated in FIG. 11, is used to advantage. The modified device includes a unitary central support 40 in which are journalled a pair of shafts 41, 42, each adapted for independent actuation by a separate lever 43 or 44. The separate shafts are locked against axial displacement by means of pins 45.

At the ends of the shafts 41, 42 of the modified device are eccentric bosses (not illustrated) which engage connectors for effecting interocular adjustment in the manner before described, independent adjustment being permitted, however, by separate operation of the levers 43, 44. In other respects, the device of FIG. 11 may be the same as that of FIGS. 1–10.

In the form of the invention illustrated in FIGS. 12–19, there is incorporated a modified type of interocular adjustment, as well as an improved optical system especially adapted for use in the new, compact binoculars. In the modified design, casings 50, 51, of the box-like form previously described, are engaged slidably upon a unitary central support member 52 provided with a central section 53 and end sections 54, 55. The end sections are of U-shape configuration, providing unobstructed fields of sight from eyepieces 56 to objectives 57 mounted in the casings, in all operative positions of the casings relative to the support.

The central section 53 of the support is hollow, and extending therethrough is a yoke 58, to be described in more detail. The yoke 58 has a threaded center portion engaged by a threaded shaft 59 journalled at its ends in the support 52. The shaft 59 is disposed parallel to the optical axes of the binocular assembly and is adapted, upon rotation, to shift the yoke forwards or backwards relative to the support 53.

Advantageously, the threaded shaft 59 is locked against axial movement by means of a thin washer 60, which is secured to the support 53 by a screw 61 and has a portion extending into an annular groove 62 in the shaft. A portion of the shaft 59 is exposed at the forward side of the support 59, and to this portion is secured a thumb wheel 63, by means of a screw 64. The thumb wheel 63 is substantially contained within a recess 63' in the support, but portions of the wheel are exposed above and below the support as shown in FIG. 14, whereby the wheel may be engaged manually for delicate manipulation.

At the outer ends of the yoke 58 are U-shaped sections as forks 65 comprising vertically spaced arms 66, 67 provided with grooves 68 extending transverse the optical axes. Received slidably in the grooves are tongues 69, which advantageously form integral parts of eyepiece mounts 70. As shown best in FIG. 17, the arms 66 are spaced apart far enough to provide an unobstructed field of sight, and the tongues 69 are also located out of the field, as determined in part by apertures 71 in the eyepiece mounts.

Figure 13:
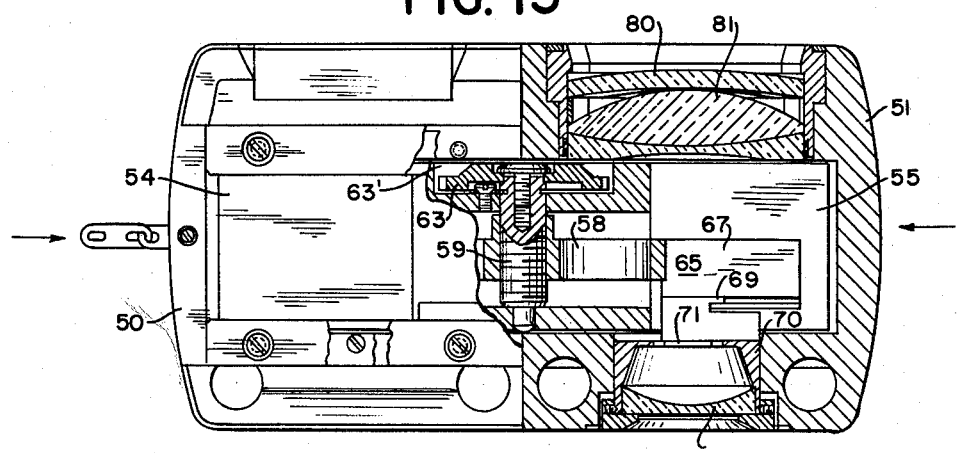
FIG. 13 is a plan view, partly in section, of the binocular of FIG. 12, with the casing parts in closed positions.

The sliding tongue and groove intersection between the yoke 58 and the eyepiece mounts 70 accommodates relative movement of the casings 50, 51 toward and away from each other and permits optical adjustment in all operative positions of the casings. In this respect, as long as the casings are separated far enough to provide access to the thumb wheel 63, the wheel may be manipulated to move the yoke and the eyepiece mounts 70 forward or backward, in the direction of the optical axes. When the casings are fully closed, as shown in FIG. 13, the unitary central support 52 is totally enclosed and the thumb wheel 63 is concealed and protected, the recess 63' in which the thumb wheel is received being of sufficient depth to permit the casing parts to clear the front of the wheel in closing.

Mechanically, the form of the invention shown in FIGS. 12–19 is substantially the same as the first described embodiment, except in the respects noted, and the various advantages of the design, such as extreme compactness, ruggedness, etc., are fully realized.

In accordance with another of the important specific aspects of the invention, the binocular assembly of FIGS. 12–19 incorporates an improved optical system providing for a substantially increased effective field of view while substantially avoiding the problems normally involved in correcting for color, distortion and astigmatism. Thus, the optical elements of the binocular assembly are arranged generally in Galilean telescope combination. In such an optical arrangement the field of view decreases as the magnification increases and is directly dependent on the aperture ratio of the objective—that is, the quotient of its aperture and its focal length. Normally, if an attempt is made to increase the field of view by increasing the aperture ratio, the various corrections for color, distortion and astigmatism become extremely difficult. The improved optical arrangement, however, substantially avoids these problems, while providing the desired wide field of view.

In keeping with the overall concept of providing an extremely compact binocular assembly, it is advantageous to provide a generally rectangular objective, in which the top and bottom sections of the objective lenses are removed. This permits of a very wide field of view, horizontally, and the slight restriction of the field in vertical directions is unimportant and is generally not a disadvantage. In this respect, binocular assemblies of the type contemplated herein are generally used in connection with stage shows or sporting events, where the vertical range of the field of activity is quite small, although the horizontal range may be quite large, as at a race track, for example.

Referring more particularly to FIGS. 18 and 19, the objective, generally designated by the numeral 57, comprises three lens components 80–82, and the eyepiece 56 comprises a single lens. The frontmost lens 80 of the objective is formed of an optical glass having the characteristics of or similar to "Schott BaKl" and is formed on a diameter of about 31 millimeters. The radius of the front surface 83 is 112.5 millimeters, while the radius of the back surface 84 is 139.0 millimeters. The thickness of the lens is 2.1 millimeters. To provide the desired rounded end, generally rectangular lens form, upper and lower chordal portions of the lens are removed, leaving a symmetrical center portion having a width of about 19 millimeters. The intermediate lens 81 of the objective is formed of optical glass similar to that used in the forward lens 80 and has substantially the same peripheral outline. The radius of the front surface 85 of the intermediate lens is 27.0 millimeters, while the radius of the back surface 86 is −69.4 millimeters. The thickness of the lens 81 is 7.5 millimeters. The spacing between the front and intermediate objective lenses 80, 81 is zero.

Directly in back of the intermediate lens 81 is the lens 82, which conforms intimately with the back surface of the intermediate lens 81, the front surface 87 of the lens 82 having a radius of —69.4. The back surface 88 of the lens has, in this case, a radius of +69.4 millimeters. The thickness of the back lens 82 is 1.2 millimeters. The outline of the front portion of the lens 82 is the same as that of the lenses 80, 81. However, the back surface 88 may be ground in circular form, to a diameter of 26 millimeters. The optical glass used in forming the back lenses 82 advantageously has the characteristics of or similar to "Schott F7."

The eyepiece lens 56 is advantageously circular in form, having a diameter of 18 millimeters. The front surface 89 of the eyepiece lens has a radius of —17.20 millimeters, while the back surface 90 has an infinite radius. The thickness of the eyepiece lens is 1.2 millimeters, and the spacing between this lens and the objective is 33.8 millimeters. The optical glass used to form the eyepiece lens is advantageously the same as that used in the objective lenses 80, 81.

As shown best in FIGS. 13 and 17, each eyepiece mount 70 is provided forwardly of the eyepiece lens or ocular 56 with an aperture forming an exit pupil. This aperture is located 18.2 millimeters in front of the plane surface of the eyepiece lens and is shaped in proportion to the generally rectangular shape of the objective. In the illustrated assembly, the arcuate end portions of the aperture 71 are formed on a diameter of 12 millimeters, and the top to bottom width of the aperture is 7.2 millimeters. The eyepiece mount 70 is so formed that the average location of the eye is about 8 millimeters from the plane surface of the eyepiece lens.

The improved optical system is especially adapted for incorporation in the compact binocular assembly before described, since it affords a wide horizontal field of view, free of the various undesirable distortions, but does not increase the thickness of the assembly. And, while generally rectangular objectives have been proposed heretofore, the specific optical system of the invention results in high-quality optical characteristics and is thus suitable for use in a precision assembly of the type contemplated.

The binocular assembly of the invention is outstanding in its mechanical as well as its optical characteristics in that, while it is of a "collapsible" nature, there is no sacrifice of mechanical precision and overall ruggedness. This advantageous result is realized throughout the provision of box-like optical casings engaged by a unitary central support and slidable on such support from closed positions, in which the support is completely enveloped, to open positions in which the casings are separated for use. Interocular adjustment, enabling the separate optical systems to be aligned properly with the eyes of various users is readily accomplished by adjusting one or both of the casings on the unitary support. And, if desired, appropriate means may be provided for interconnecting the optical casings for movement in unison toward and away from the center of the support.

When the new binocular assembly is closed, it is extremely compact and the objectives and eyepieces are concealed within the physical outlines of the box-like casings. Thus, it is possible to carry the binocular assembly about in a pocket or purse without providing a special casing. However, if additional lens protection is desired, shutter means may be provided, which are actuated by closing movement of the optical casings, to slide over the lenses and afford complete protection thereof.

It should be understood, however, that the specific forms of the invention herein illustrated are intended to be representative only, as certain changes may be made therein without departing from the clear teachings of the disclosure. Accordingly, reference should be made to the following appended claims in determining the full scope of the invention.

We claim:

1. A binocular telescope comprising a pair of ocular-objective lens combinations, a box-like casing for each of said lens combinations mounting the lenses of a combination in spaced relation, said casings comprising members of U-shaped configuration having openings in their adjacent side walls between the lenses of the combinations thereof, a unitary central support member disposed transversely of said casings having end portions comprised of pairs of vertically spaced arms, pairs of said arms engaging said U-shaped members adjacent the upper and lower surfaces thereof providing an unobstructed field of sight through said U-shaped members in all operative positions of said casings relative to said support member, means for slidably interconnecting the arms of said support member and said U-shaped members permitting relative transverse movement of said casings upon said support member, the combined widths of said casings being not less than the length of said support member whereby said casings may be moved together to completely envelop said support member, and focusing means carried by said support member and extending into each of said casings in engagement with the movable lenses of each of said lens combinations in all positions of the casings relative to the support member, said focusing means including manually manipulatable means for adjusting said focusing means and the movable lenses accessible when said casings have been moved apart to positions of minimum interpupillary distance accommodation, said casings when closed completely enveloping said focusing means and the manually manipulatable portions thereof.

2. The binocular telescope of claim 1, which includes fork-shaped connector members having upper and lower portions slidable upon and guided by the facing surfaces of said pairs of arms for movement relative thereto parallel to the optical axes, said connector members including inturned flanges disposed transversely of the optical axes and engaging correspondingly grooved portions of lens mounts for the movable lenses of each of said lens combinations, said movable lenses and said connector members being also slidable in a direction transverse to the optical axes, upon relative transverse movement of said casings upon the support and means for moving said connector members parallel to the optical axes for focusing adjustment.

References Cited in the file of this patent

UNITED STATES PATENTS

| | | |
|---|---|---|
| 962,920 | Von Rohr | June 28, 1910 |
| 1,934,863 | Kuhl | Nov. 14, 1933 |
| 2,124,157 | Trautmann | July 19, 1938 |
| 2,436,574 | Johanson | Feb. 24, 1948 |
| 2,534,776 | Kershaw et al. | Dec. 19, 1950 |

FOREIGN PATENTS

| | | |
|---|---|---|
| 364,747 | Germany | Dec. 1, 1922 |
| 256 of 1900 | Great Britain | Nov. 3, 1900 |
| 28,027 | Great Britain | of 1903 |
| 135,752 | Great Britain | Dec. 4, 1919 |
| 233,323 | Great Britain | Sept. 10, 1925 |